US007819103B2

(12) United States Patent
Sasaki et al.

(10) Patent No.: US 7,819,103 B2
(45) Date of Patent: Oct. 26, 2010

(54) STRADDLE-TYPE VEHICLE

(75) Inventors: Yuichi Sasaki, Shizuoka (JP); Michihisa Nakamura, Shizuoka (JP); Takahiko Hasegawa, Shizuoka (JP); Midori Nagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 472 days.

(21) Appl. No.: 11/739,577

(22) Filed: Apr. 24, 2007

(65) Prior Publication Data

US 2007/0245996 A1 Oct. 25, 2007

(30) Foreign Application Priority Data

Apr. 25, 2006 (JP) ............................ 2006-121004

(51) Int. Cl.
*H02J 7/00* (2006.01)
*F02N 11/08* (2006.01)
*F02N 99/00* (2010.01)

(52) U.S. Cl. ............................ 123/179.2; 123/406.54; 123/185.5

(58) Field of Classification Search ... 123/179.2–179.4, 123/185.4, 406.53, 406.54; 307/10.3–10.6
See application file for complete search history.

(56) References Cited

U.S. PATENT DOCUMENTS 5,175,484 A * 12/1992 Witehira et al. ............. 320/125
5,685,802 A * 11/1997 Kanno ......................... 477/111
6,557,509 B1 * 5/2003 Hall et al. .............. 123/179.16
7,156,064 B2 * 1/2007 Namari et al. ........... 123/179.3
2004/0107950 A1 * 6/2004 Masaoka et al. ............ 123/631
2004/0183376 A1 * 9/2004 Tarbert ....................... 307/10.3
2007/0215444 A1 * 9/2007 Ehara et al. ............. 200/82 DA

FOREIGN PATENT DOCUMENTS

JP 2005-193703 7/2005

* cited by examiner

*Primary Examiner*—Stephen K Cronin
*Assistant Examiner*—Arnold Castro
(74) *Attorney, Agent, or Firm*—Keating & Bennett, LLP

(57) ABSTRACT

A straddle-type vehicle that omits a main switch without requiring a special operation to start the engine when battery power is supplied to engine-related electrical components. An electrical circuit has a pickup sensor that detects that the engine is in a start preparation state. An ECU connects an ignition coil, injector and fuel pump with the battery when the start preparation state is detected.

15 Claims, 13 Drawing Sheets

[FIG. 1]
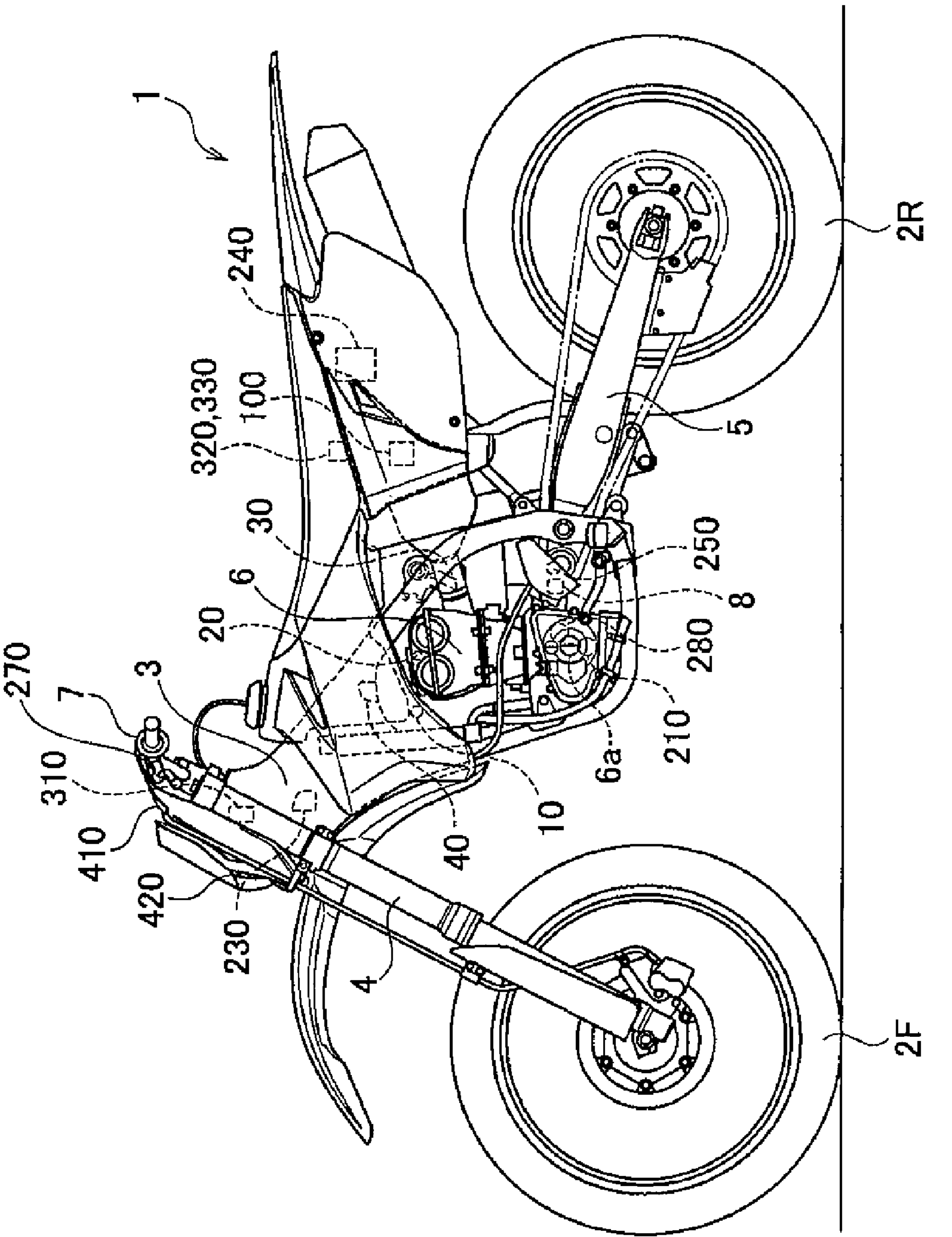

[FIG. 2]
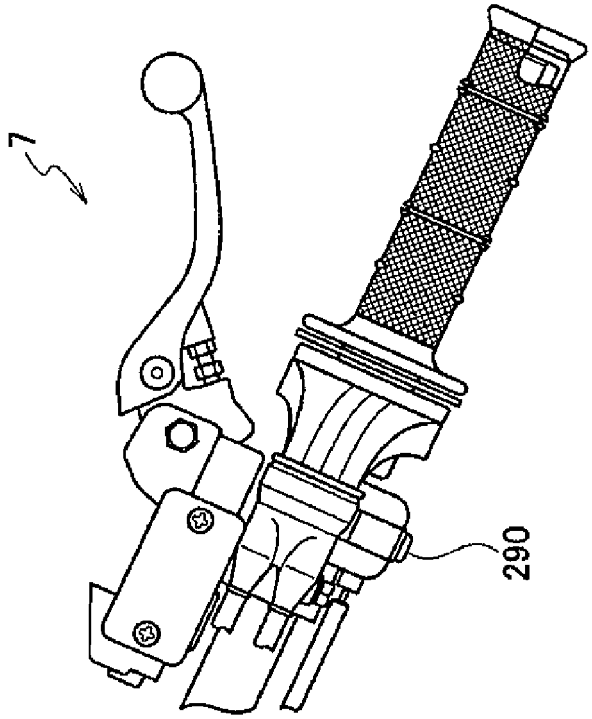
(b)
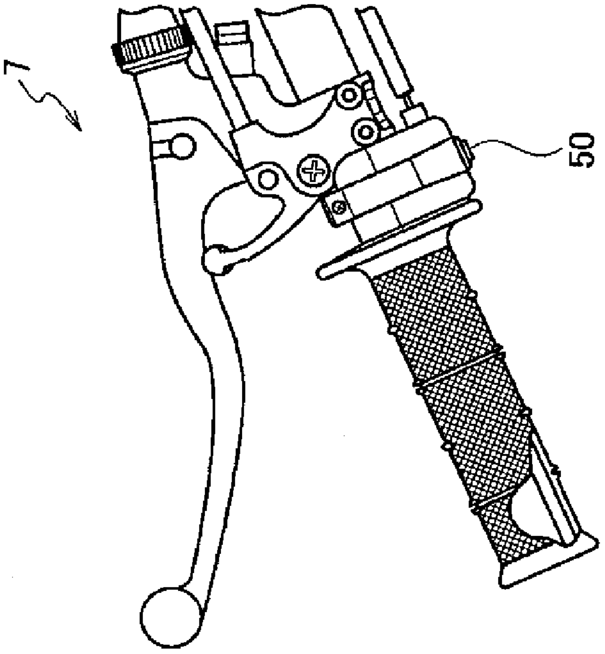
(a)

[FIG. 3]
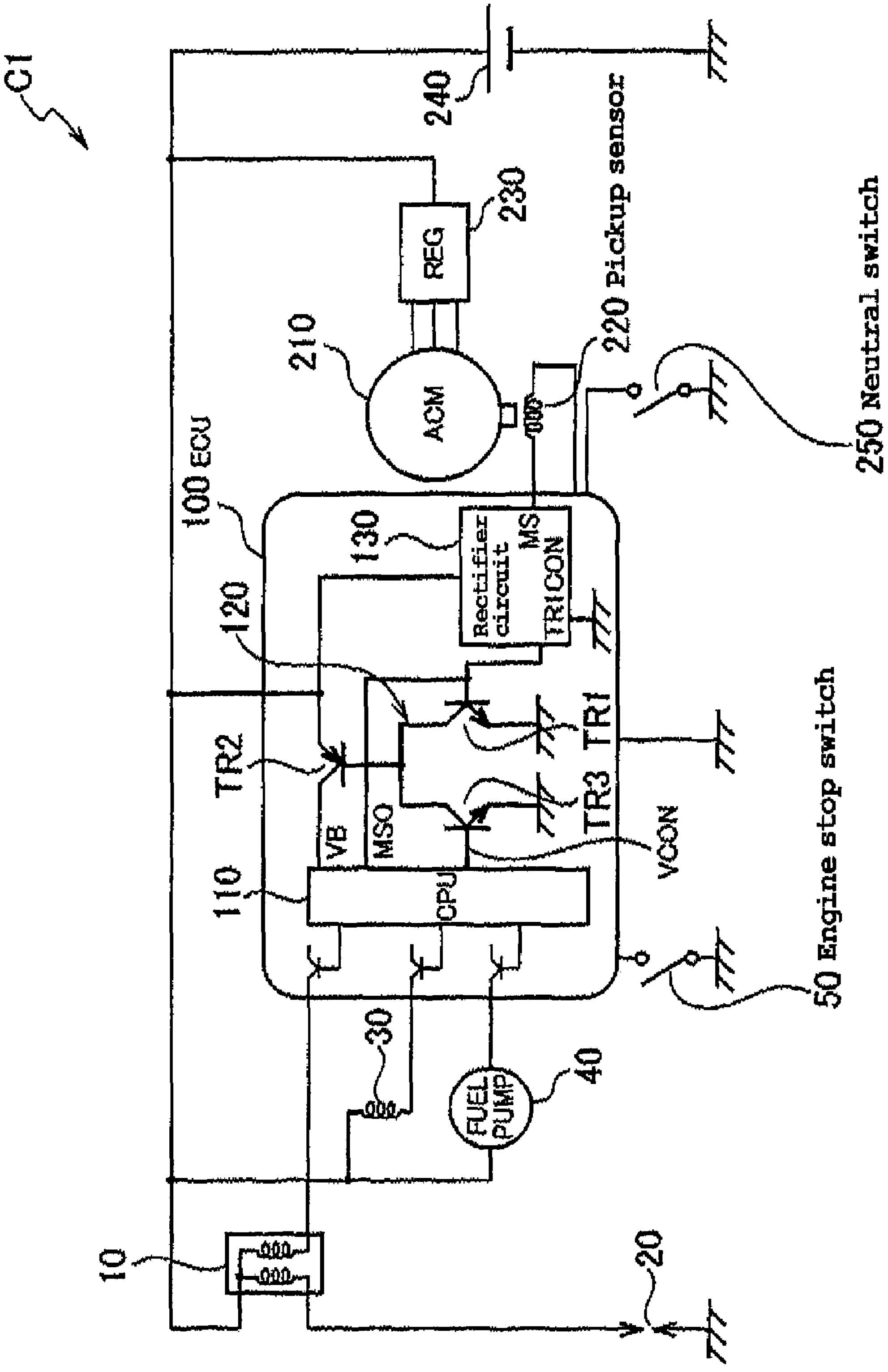

[FIG. 4]
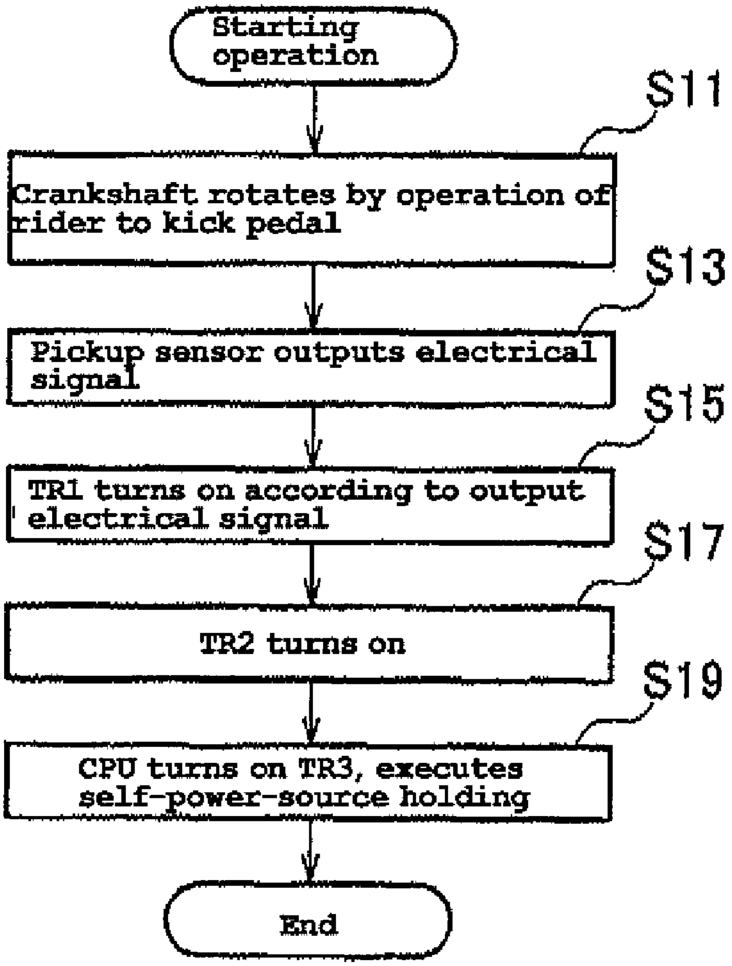

[FIG. 5]
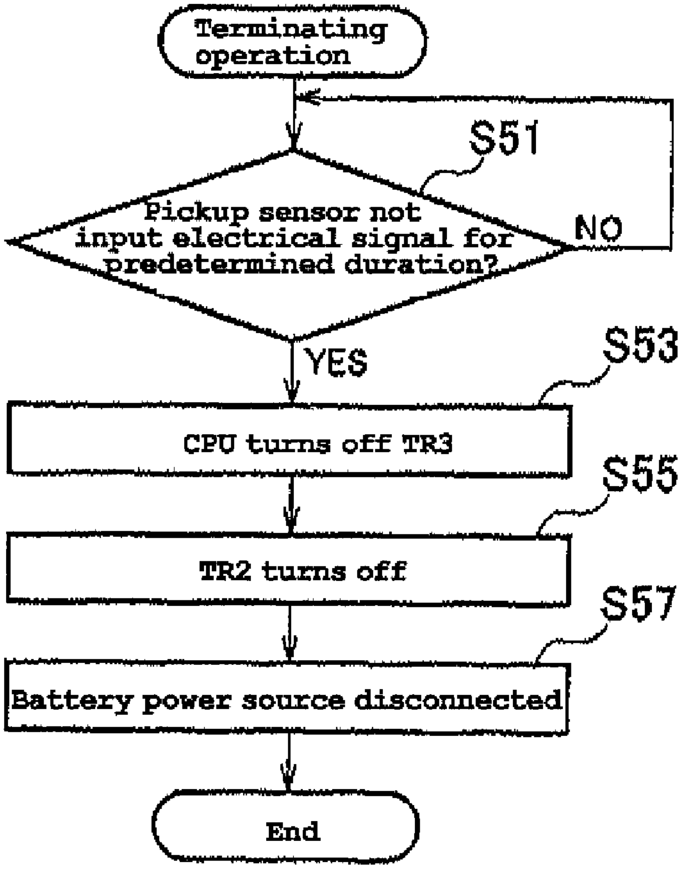

[FIG. 6]
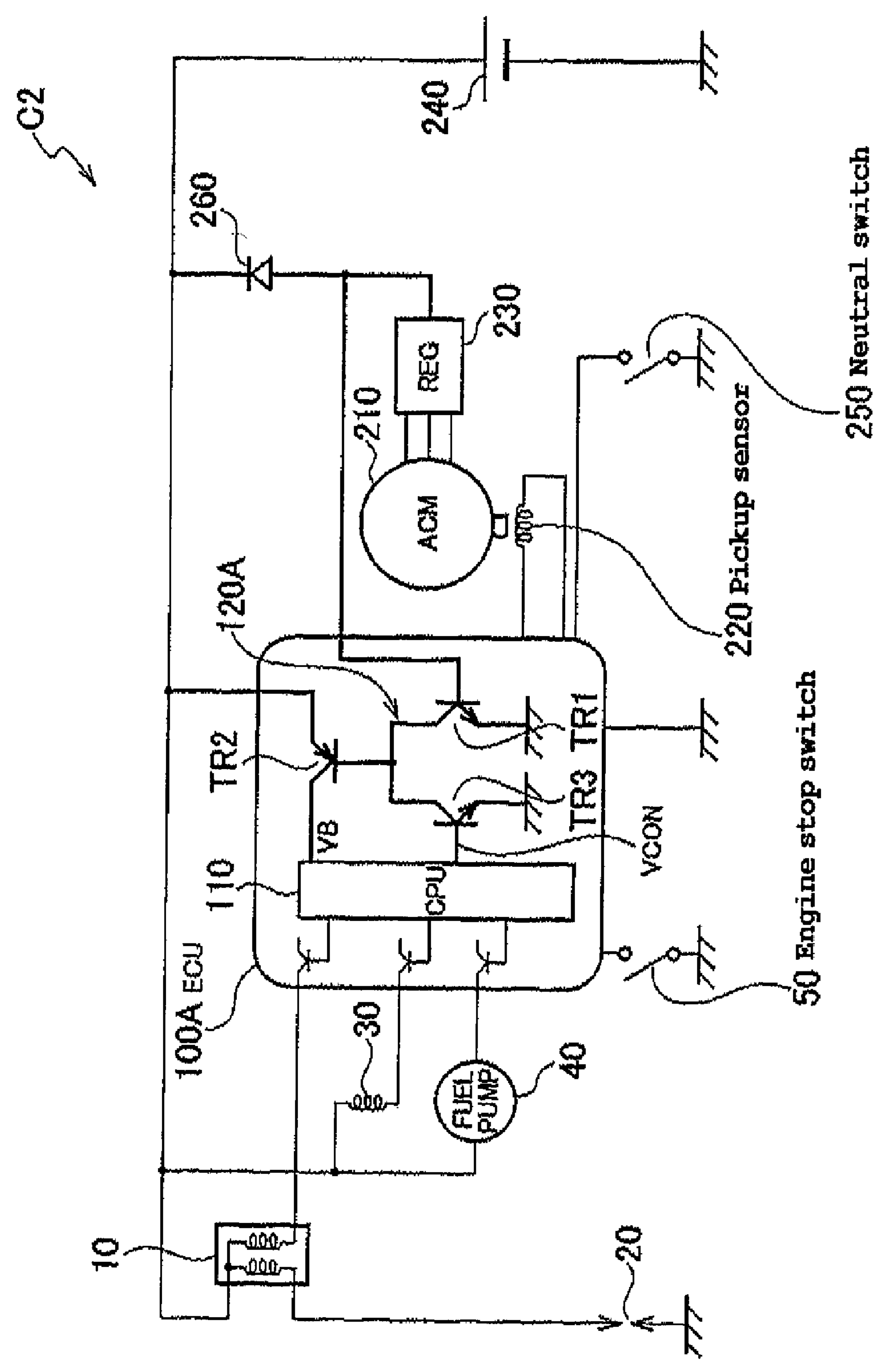

[FIG. 7]
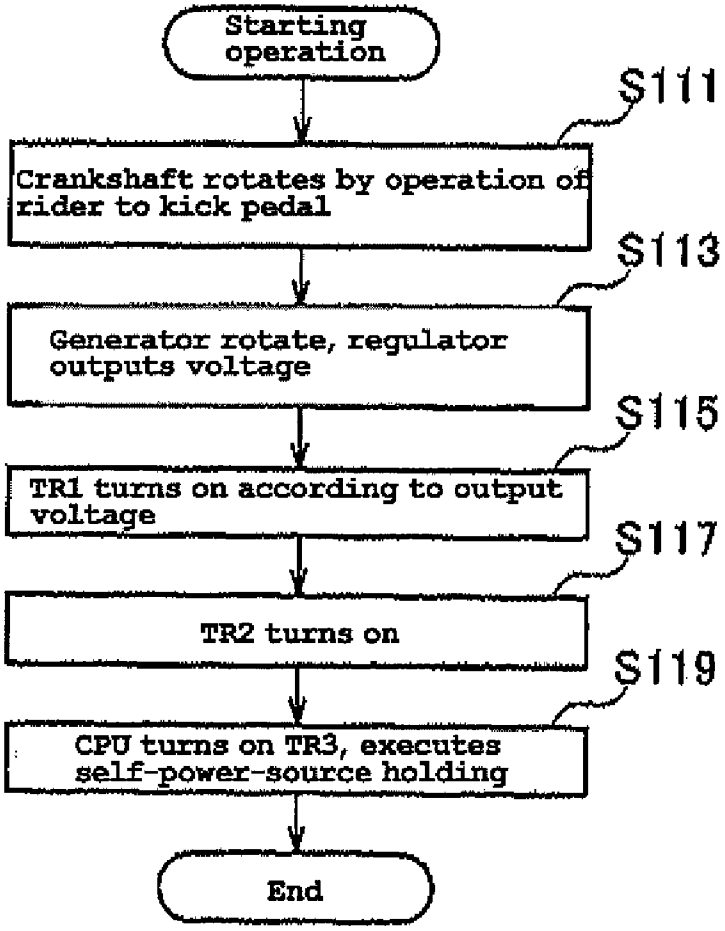

[FIG. 8]
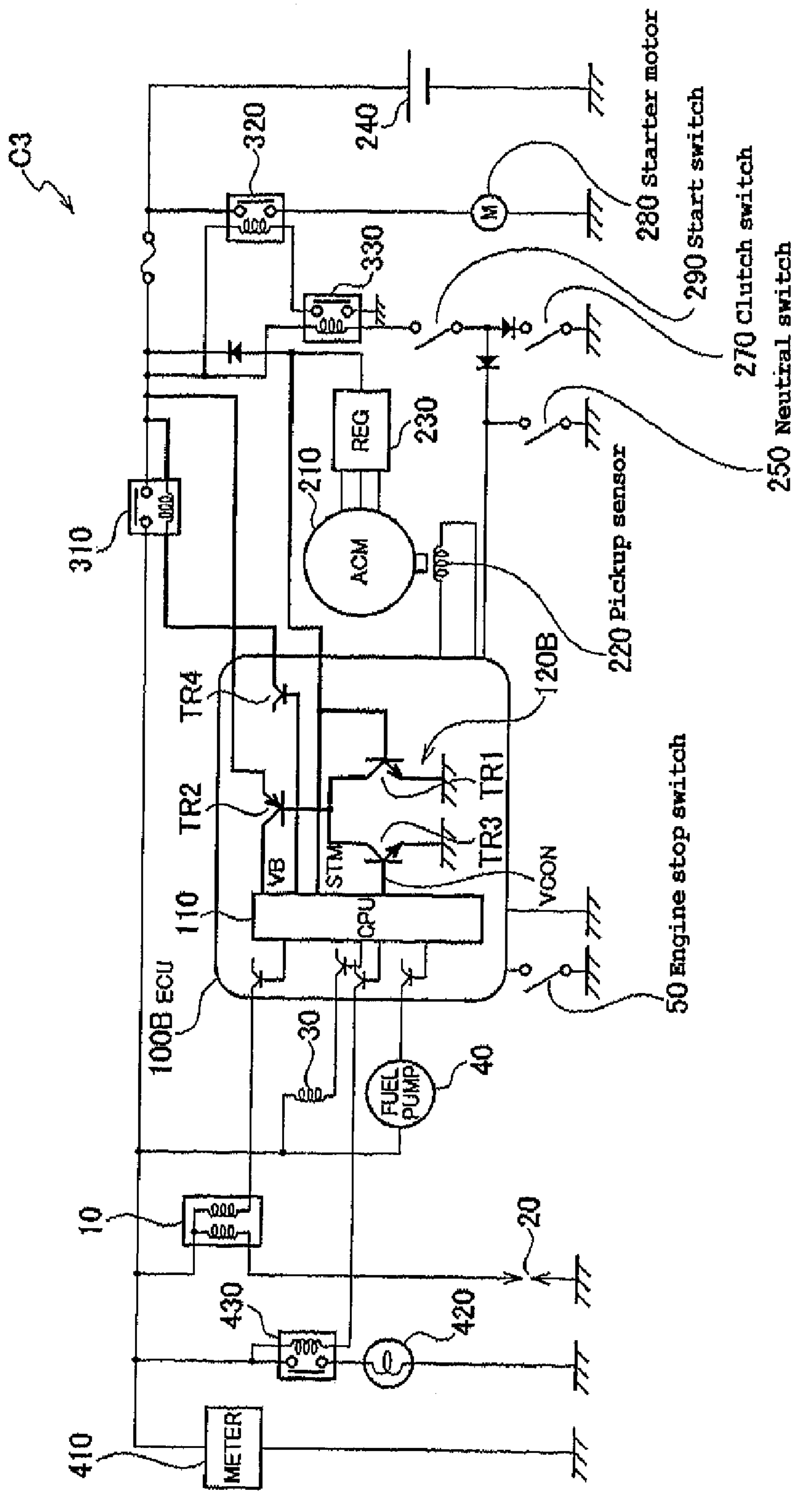

[FIG. 9]
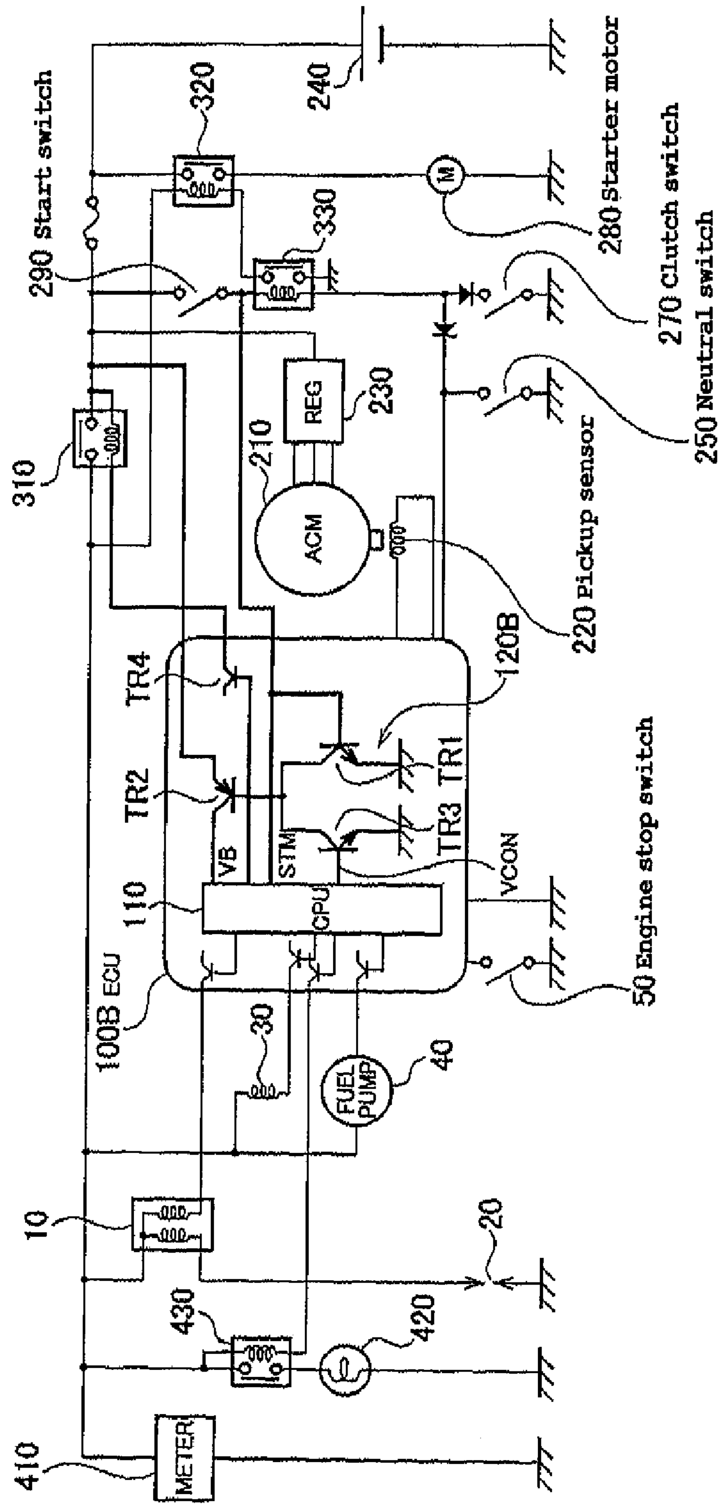

[FIG. 10]
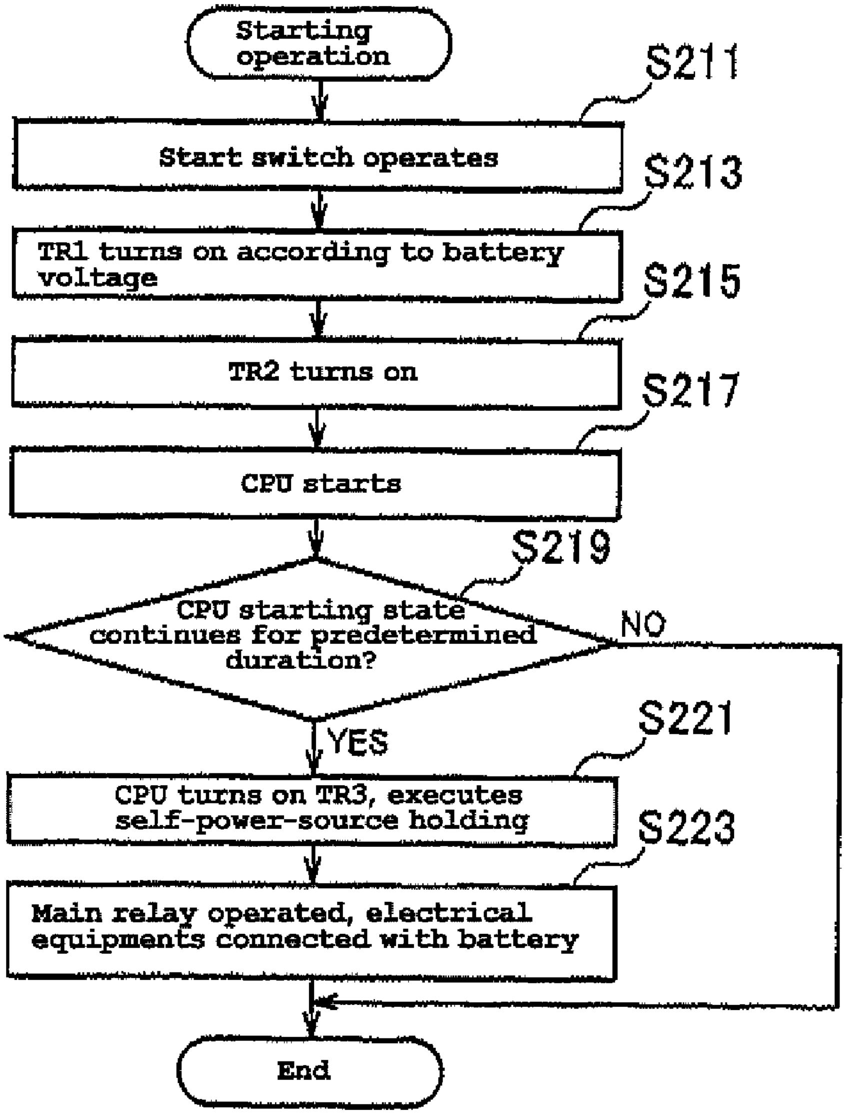

[FIG. 11]
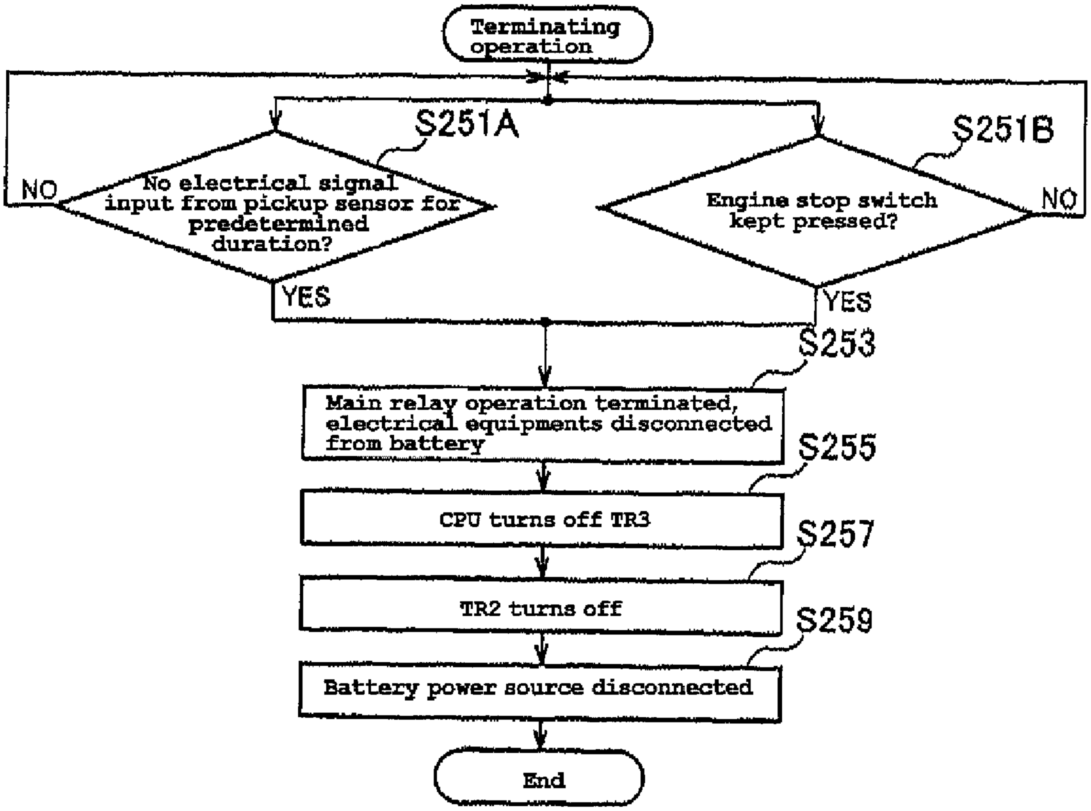

[FIG. 12]
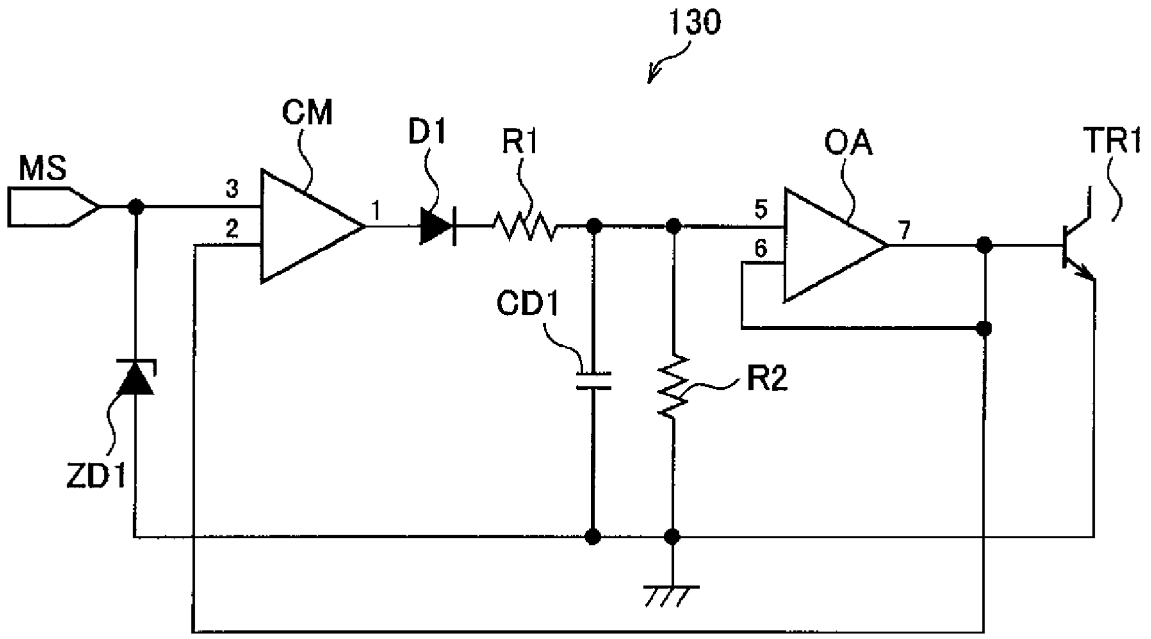

[FIG. 13]
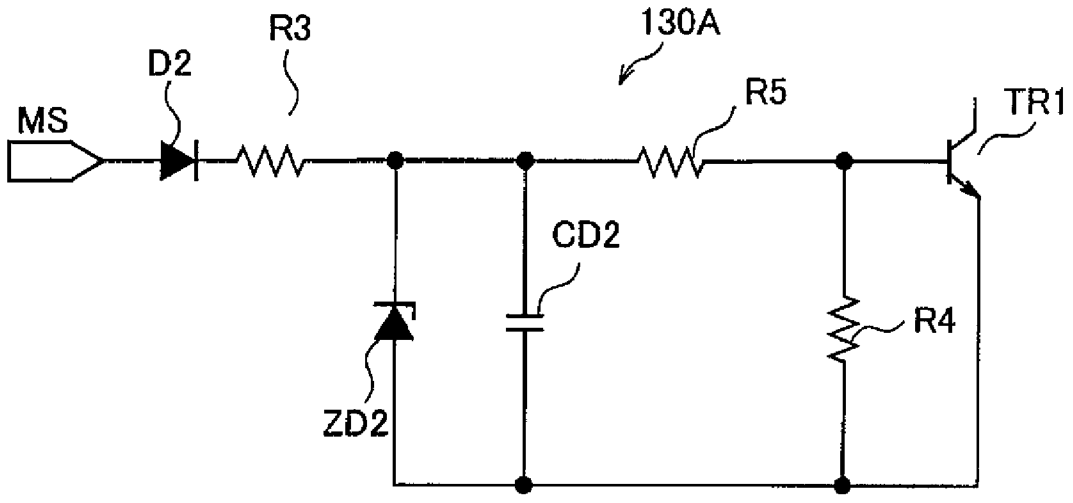

STRADDLE-TYPE VEHICLE

RELATED APPLICATIONS

This application claims the benefit of priority under 35 USC 119 of Japanese patent application no. 2006-121004, filed on Apr. 25, 2006, which application is hereby incorporated by reference in its entirety.

BACKGROUND OF THE INVENTION

1. Field of the Invention

The present invention relates to an electrical circuit for supplying power to electrical components for driving an engine of a straddle-type vehicle. More specifically, the invention relates to a straddle-type vehicle that omits a main switch for connecting the engine-related electrical components and the battery.

2. Description of Related Art

A straddle-type vehicle such as a motorcycle often includes a main switch for turning on and off power supplied to the engine ignition system and the like. In vehicles used for competitions such as off-road races, however, the main switch may be omitted to prevent misoperation and to reduce weight (for example, see JP-A-2005-193703 (pages 5-6 and FIG. 7)). When the main switch is omitted, the rider keeps holding a clutch lever and pushes a start switch to operate a starter motor and start the engine.

In vehicles in which the main switch is omitted, power supplied by a battery is generally not used for electrical components used for engine operation (hereinafter referred to as "engine-related electrical components"), such as an ignition system. The battery is mainly used to provide power to the starter motor. Therefore, it is only necessary for the straddle type vehicle to control the supply and shutoff of power supplied by the battery to the starter motor.

When power is supplied by the battery to engine-related electrical components, such as during an engine start, it must not be supplied for a long time in order to protect the battery if the engine is not in operation.

When a main switch is omitted, the rider has to conduct a special operation such as holding a clutch lever and pushing a start switch. This is a disadvantage for general-purpose use.

SUMMARY OF THE INVENTION

The present invention addresses these issues and provides a straddle type vehicle that omits a main switch but does not require any special operation to start the engine when battery power is supplied to engine-related electrical components.

A straddle-type vehicle according to the invention has an engine and an electrical circuit including engine-related electrical components that drive the engine and a battery that supplies power to the engine-related electrical components. A connection control means controls the electrical circuit into a connected state connecting the battery and the engine-related electrical components and a disconnected state disconnecting the battery and the engine-related electrical components. An engine-start detection means detects a start preparation state of the engine. The connection control means turns the electrical circuit from the disconnected state to the connected state according to a detection of the start preparation state by the engine start detection means, and maintains the connected state.

The engine-start detection means detects that the engine is in the start preparation state, which means the engine is about to start. Based on a detection of the start preparation state, the electrical circuit turns from the disconnected state to the connected state, and the connected state is maintained. Therefore, for example, when a rider operates a kick pedal, it is detected that the engine is about to start. The battery and the engine-related electrical components are automatically connected, and the engine-related electrical components operate.

According to the invention, a main switch is omitted, without requiring any special operation for starting the engine when battery power is supplied to the engine-related electrical components.

In one embodiment of the invention, the start preparation state is detected without power supplied by the battery.

In another embodiment of the invention, the start preparation state is detected according to an operation of a kick pedal.

In a further embodiment of the invention, the engine has a crankshaft, and the engine-start detection means is a crankshaft-rotation detection sensor.

In a further embodiment of the invention, a generator is driven by the engine and a regulator regulates a voltage of electric power generated by the generator in a predetermined range. The engine-start detection means is an electrical circuit that detects electric power output by the regulator.

In a further embodiment of the invention, a first switching element detects an electrical signal indicating the start preparation state output by the engine-start detection means and allows continuity of the electrical signal according to a detection of the electrical signal. A second switching element is connected with the first switching element and the battery for supplying battery power when the first switching element allows continuity of the electrical signal. A control unit connected with the second switching element turns the disconnected state into the connected state according to power supplied by the battery through the second switching element and maintains the connected state.

In a further embodiment of the invention, the connection control means turns the electrical circuit from the connected state into the disconnected state if the crankshaft-rotation detection sensor does not detect a rotation of the crankshaft for a predetermined time.

In a further embodiment of the invention, the connection control means turns the electrical circuit from the connected state into the disconnected state if electric power output by a regulator is not detected for a predetermined time.

In a further embodiment of the invention, a starter motor uses power supplied by the battery to rotate a crankshaft and start the engine. A starter motor switch connects the battery and the starter motor. The connection control means has a relay that supplies battery power to the engine-related electrical components when the battery and the starter motor are connected by operation of the starter motor switch.

In a further embodiment of the invention, the engine related-electrical components include an injector that sprays fuel supplied to the engine, a fuel pump that supplies fuel to be sprayed by the injector, and a fuel injection control unit that controls fuel sprayed by the injector.

The present invention accordingly provides a straddle-type vehicle that omits a main switch without requiring any special operation for starting the engine when power from a battery is supplied to engine-related electrical components.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the present invention.

FIG. 2 is an enlarged view of handle grips of a motorcycle according to the present invention.

FIG. 3 is a diagram of an electrical circuit according to a first embodiment of the present invention.

FIG. 4 is a flowchart of a starting operation of the electrical circuit according to the first embodiment of the present invention.

FIG. 5 is a flowchart of a terminating operation of the electrical circuit according to the first embodiment of the present invention.

FIG. 6 is a diagram of an electrical circuit according to a second embodiment of the present invention.

FIG. 7 is a flowchart of a starting operation of the electrical circuit according to the second embodiment of the present invention.

FIG. 8 is a diagram of an electrical circuit according to a third embodiment of the present invention.

FIG. 9 is a diagram of an electrical circuit according to a fourth embodiment of the present invention.

FIG. 10 is a flowchart of a starting operation of the electrical circuit according to the fourth embodiment of the present invention.

FIG. 11 is a flowchart of a terminating operation of the electrical circuit according to the fourth embodiment of the present invention.

FIG. 12 is a diagram of an exemplary rectifier circuit according to an embodiment of the present invention.

FIG. 13 is a diagram of a modified rectifier circuit according to an embodiment of the present invention.

DETAILED DESCRIPTION OF THE INVENTION

An embodiment of a straddle-type vehicle according to the present invention is now described with reference to accompanying drawings. In the drawings, identical or similar reference symbols and numbers are used for identical or similar components. It should also be noted that drawings are exemplary and ratios in dimensions are different from those in actual dimensions. Therefore, specific dimensions should be understood based on the following description. It should also be understood that the ratios or proportions of the components may be different for different drawings.

FIG. 1 is a left side view of a motorcycle 1 forming a straddle-type vehicle according to an embodiment of the invention. Motorcycle 1 may be used for off-road competitions such as motocross and the like. Motorcycle 1 does not have a carburetor, but has an injector 30, fuel pump 40, and ECU 100 (a fuel injection system) to control the air-fuel mixture supplied to engine 6. A main switch for switching on and off power supplied to injector 30, fuel pump 40, ECU 100 and so forth is omitted from motorcycle 1.

Motorcycle 1 includes a front wheel 2F and a rear wheel 2R. A front fork 4, rear arm 5 and engine 6 are provided on a body frame 3. Front wheel 2F is supported by front fork 4, and rear wheel 2R is rotatably supported by rear arm 5. Engine 6 is a 4-cycle (or 2-cycle) internal combustion engine having a crankshaft 6*a*. Engine 6 rotates rear wheel 2R to generate drive force. A handle 7 is connected with front fork 4 and used by a rider to steer front wheel 2F to a left side or to a right side for controlling a driving direction.

Kick pedal 8 is installed on a right side of motorcycle 1. Kick pedal 8 is used for starting engine 6. When kick pedal 8 is operated by a rider, crankshaft 6*a* rotates, and engine 6 starts. Motorcycle 1 may have starter motor 280 as described below. In this case, kick pedal 8 is not necessarily provided.

As shown in FIG. 1, motorcycle 1 has an ignition coil 10, sparkplug 20, injector 30, fuel pump 40, and ECU 100. Ignition coil 10 generates a high voltage for sparking sparkplug 20. Injector 30 sprays fuel supplied by fuel pump 40 into engine 6 under control of ECU 100. Ignition coil 10, injector 30, and fuel pump 40 form "engine-related electrical components" used for operation of engine 6.

Motorcycle 1 also has a generator 210, a regulator 230, and a battery 240. Generator 210 (ACM) is a generator driven by engine 6. Regulator 230 regulates a voltage of electric power generated by generator 210 in a predetermined range. Battery 240 supplies power (more specifically, a direct current) to ignition coil 10, sparkplug 20, injector 30, fuel pump 40, ECU 100 and so on. A neutral switch 250 turns on when the transmission (not shown) is in neutral.

Clutch switch 270 turns on when a clutch is engaged. Starter motor 280 operates with power supplied by battery 240 and rotates crankshaft 6*a* to start engine 6. A main relay 310, starter relay 320 and a relay 330 are disposed in predetermined positions in electrical circuit C1 (FIG. 3) for connecting the components described above. Meter 410 indicates conditions such as operating speed of engine 6 and driving speed, and a headlight 420 is provided.

FIG. 2(*a*)-(*b*) show left and right handle grips disposed on handle 7. The left handle grip includes an engine stop switch 50, and the right handle grip includes a start switch 290 for rotating starter motor 280 (when starter motor 280 is provided).

First Embodiment

An electrical circuit C1 according to a first embodiment of the invention is mounted on motorcycle 1 and described with reference to FIGS. 3-5.

Structure of the Electrical Circuit

As shown in FIG. 3, circuit C1 includes ECU 100 connected with ignition coil 10, injector 30, fuel pump 40 and engine stop switch 50. Ignition coil 10 is connected to sparkplug 20. ECU 100 is also connected with pickup sensor 220, regulator 230, battery 240 and neutral switch 250.

ECU 100 operates with power (a direct current) supplied by battery 240. When engine 6 is in operation, ECU 100 operates with direct current supplied by battery 240 and electric power output by regulator 230. ECU 100 controls injector 30, fuel pump 40 and others. ECU 100 can connect and disconnect battery 240 and the engine-related electrical components. More specifically, ECU 100 can connect ignition coil 10, injector 30, and fuel pump 40 with battery 240, so that a direct current is supplied by battery 240. In addition, ECU 100 can disconnect injector 30 and fuel pump 40 from battery 240, so that the direct current is not supplied.

Generator 210 is driven by engine 6 while engine 6 is in operation and generates electric power. Pickup sensor 220 detects a state of generator 210. More specifically, pickup sensor 220 detects whether crankshaft 6*a*, which rotates in conjunction with generator 210, is rotating or not. In this embodiment, pickup sensor 220 forms the crankshaft-rotation detection sensor. In other words, pickup sensor 220 detects the fact that engine 6 is in the "start preparation state", where engine 6 is about to start. Pickup sensor 220 also functions as the engine-start detection means.

ECU 100 forms a connection control means that turns circuit C1 into a "connected state", where battery 240 and the engine-related electrical components are connected for supply of a power, or a "disconnected state", where battery 240 and the engine-related electrical components are disconnected. More specifically, ECU 100 turns circuit C1 from the disconnected state to the connected state when pickup sensor 220 (the engine-start detection means) has detected that engine 6 is about to start (the start preparation state).

While engine 6 is not in operation, when a rider operates kick pedal 8 to start engine 6, crankshaft 6*a* rotates. Pickup sensor 220 detects the rotation of crankshaft 6*a* and outputs a predetermined electrical signal (an alternating current) to ECU 100. When this electrical signal is input from pickup sensor 220, ECU 100 establishes the connection in a manner that power supplied by battery 240 is supplied to the engine-related electrical components to operate the engine-related electrical components.

ECU 100 maintains the connected state as long as an "operation stop condition" of engine 6 is not satisfied. The operation stop condition means that pickup sensor 220 does not detect a rotation of generator 210, that is, crankshaft 6*a*, for a predetermined time (for example, three minutes). If the operation stop condition is satisfied, ECU 100 turns circuit C1 from the connected state to the disconnected state. In other words, when engine stop switch 50 is pushed to stop operation of engine 6, pickup sensor 220 does not detect a rotation of crankshaft 6*a*, so that an electrical signal is not output to ECU 100. If an electrical signal is not input from pickup sensor 220 for a predetermined time, ECU 100 disconnects the power supplied by battery 240 from the engine-related electric equipment to stop operations of the engine-related electric equipment.

ECU 100 includes CPU 110, a self-power-source holding circuit 120, and a rectifier circuit 130. CPU 110 forms a fuel injection control unit and controls ignition coil 10, injector 30, and fuel pump 40. Self-power-source holding circuit 120 includes transistors TR1-TR3. Rectifier circuit 130 rectifies an electrical signal output from pickup sensor 220, more specifically an alternating current to a direct current.

Transistor TR1 has B, C, and E terminals connected, respectively, with rectifier circuit 130, a ground, and transistor TR2. Transistor TR1 detects an electrical signal output by pickup sensor 220 with the B terminal. In response to a detection of the electrical signal, transistor TR1 turns on. In this embodiment, transistor TR1 forms a first switching element. The B terminal of transistor TR2 is connected with transistor TR1 and transistor TR3. The E terminal of transistor TR2 is connected with a connection line to battery 240 and rectifier circuit 130. The C terminal of transistor TR2 is connected with CPU 110. Transistor TR2 supplies CPU 110 with power (direct current) supplied by battery 240 while transistor TR1 allows continuity (turns on). In this embodiment, transistor TR2 forms a second switching element. Transistor TR3 has B, C, and E terminals connected, respectively, with CPU 110, a ground, and transistor TR2.

Rectifier circuit 130, shown in FIG. 12, operates with power supplied by battery 240. Rectifier circuit 130 includes an operational amplifier OA, a comparator CM, a diode D1, a Zener diode ZD1, resistors R1 and R2, and a capacitor CD1. An output from operational amplifier OA is connected to the B terminal of transistor TR1.

FIG. 13 shows a modified rectifier circuit 130A that operates without power supplied by battery 240 but with electric power generated by generator 210. Rectifier circuit 130A includes a diode D2, a Zener diode D2, resistors R3-R5, and a capacitor CD2.

CPU 110 starts operation with power from battery 240 supplied via transistor TR2, and turns the engine-related electrical components (ignition coil 10, injector 30, and fuel pump 40) from the disconnected state to the connected state. In addition, CPU 110 turns on transistor TR3, and maintains the connected state (self-power-source holding).

As described above, CPU 110 (ECU 100) maintains the connected state as long as the "operation stop condition" of engine 6 is not satisfied. In this embodiment, CPU 110 forms a control unit. More specifically, CPU 110 monitors a voltage (MSO) input from rectifier circuit 130 at intervals of a short time (for example, one second), and determines whether the voltage input from rectifier circuit 130 stops for a predetermined time (for example, three minutes). If the voltage input from rectifier circuit 130 stops for a predetermined time, CPU 110 turns circuit C1 from the connected to the disconnected state, which means CPU 110 disconnects the engine-related electrical components from battery 240.

Operation of the Electrical circuit

An operation of electrical circuit C1 is now described. More specifically, (1) a starting operation and (2) a terminating operation of circuit C1 are described.

(1) Starting Operation

FIG. 4 is a flowchart of a starting operation of circuit C1. A rider operates kick pedal 8 in step S11, and crankshaft 6*a* rotates. In step S13, pickup sensor 220 detects that crankshaft 6*a*, which rotates in conjunction with generator 210, is rotating, and outputs an electrical signal (an alternating current) to self-power-source holding circuit 120 (transistor TR1). In step S15, an electrical signal output from pickup sensor 220 turns on transistor TR1. In step S17, transistor TR2 turns on as transistor TR1 turns on.

In step S19, CPU 110 starts an operation with power (a direct current) supplied by battery 240 via transistor TR2. In addition, CPU 110 turns on transistor TR3, and executes a self holding to maintain power supplied by battery 240 supplied to ECU 100. In other words, ECU 100 detects a state where engine 6 is about to start (the start preparation state), and executes self holding to maintain power supplied by battery 240. As a result, a supply of power (a direct current) from battery 240 to the engine-related electrical components (ignition coil 10, injector 30, and fuel pump 40) starts, and the engine-related electrical components start operations.

(2) Terminating Operation

FIG. 5 is a flowchart of a terminating operation of circuit C1. In step S51, CPU 110 detects that pickup sensor 220 does not input an electrical signal for a predetermined time (for example, three minutes). In other words, CPU 110 detects that engine 6 is not in operation. When pickup sensor 220 does not input an electrical signal for a predetermined time (YES in step S51), CPU 110 turns off transistor TR3 in step S53. In step S55, transistor TR2 turns off as transistor TR3 turns off. In step S57, as transistor TR2 turns off, the supply of power (a direct current) by battery 240 to the engine-related electrical components stops. As a result, the engine-related electrical components (ignition coil 10, injector 30, and fuel pump 40) stop.

Second Embodiment

An electrical circuit C2 according to a second embodiment of the invention is described with reference to FIGS. 6 and 7. The following description is mainly of differences from circuit C1 of the first embodiment, and description that is the same as that of circuit C1 is omitted.

Structure of the Electrical Circuit

Circuit C1 according to the first embodiment detects that engine 6 is about to start based on an electrical signal output by pickup sensor 220. Circuit C2, by contrast, detects that engine 6 is about to start based on electric power (more specifically, voltage) output by regulator 230.

ECU 100A turns circuit C2 from the disconnected state to the connected state when it is detected that engine 6 is about to start (the start preparation state) based on electric power output by regulator 230. ECU 100A turns circuit C2 from the connected state to the disconnected state if electric power output by regulator 230 is not detected for a predetermined time (for example, three minutes).

As is the case with self-power-source holding circuit 120 in the first embodiment, self-power-source holding circuit 120A includes transistors TR1-TR3. The B terminal of transistor TR1 is connected with regulator 230. Self-power-source holding circuit 120A detects electric power (more specifically, voltage) output from regulator 230. In this embodiment, self-power-source holding circuit 120A forms the engine-start detection means. Self-power-source holding circuit l2OA detects an electric current output by regulator 230. Self-power-source holding circuit 120A may not include rectifier circuit 130. A diode 260 prevents power (a direct current) supplied by battery 240 from being supplied to self-power-source holding circuit 120A.

(Operation of the Electrical Circuit)

FIG. 7 is a flowchart of a starting operation of circuit C2. The terminating operation of circuit C2 is the same as that of circuit C1 (see FIG. 5). In step S111, a rider operates kick pedal 8, which starts a rotation of crankshaft 6*a*. In step S113, generator 210 rotates in conjunction with crankshaft 6*a* and generates electric power. Regulator 230 outputs electric power (voltage) generated by generator 210 to self-power-source holding circuit 120A (transistor TR1). In step S115, a voltage output by regulator 230 turns on transistor TR1. The procedure in steps S117-S119 are the same as those of circuit C1 (see FIG. 4, steps S17-S19).

Third Embodiment

An electrical circuit C3 according to a third embodiment of the invention is described with reference to FIG. 8. The following description is mainly of differences from circuit C1 or C2 of the first and second embodiments, and description that is the same as that of circuit C1 or C2 is omitted.

(Structure of the Electrical Circuit)

Circuit C3 has starter motor 280 for starting engine 6, clutch switch 270 and start switch 290 (a starter motor switch). Clutch switch 270 detects a disconnected state of a clutch (not shown). Start switch 290 connects starter motor 280 with battery 240 so that power supplied by battery 240 is supplied to starter motor 280. Circuit C3 also includes meter 410 for indicating a condition of motorcycle 1, headlight 420 and a relay 430 for controlling the turning on and off of headlight 420.

As with self-power-source holding circuit 120A (see FIG. 6), ECU 100B includes a self-power-source holding circuit 120B formed with transistors TR1-TR3. In addition, ECU 100B includes a transistor TR4 connected with main relay 310. Main relay 310 supplies power from battery 240 to the engine-related electrical components (ignition coil 10, injector 30, and fuel pump 40) and meter 410 when starter motor 280 is connected with battery 240 by operation of start switch 290.

In other words, ECU 100B operates main relay 310 to supply power from battery 240 to the engine-related electrical components when starter motor 280 is connected with battery 240 by operation of start switch 290. Starter relay 320 supplies power from battery 240 to starter motor 280 when relay 330 operates as start switch 290 operates (turns on).

The starting and terminating operations of circuit C3 are the same as those of circuit C2, except that engine 6 is started by operation of starter motor 280 rather than kick pedal 8. Therefore, descriptions of these operations are omitted.

Fourth Embodiment

An electrical circuit C4 according to a fourth embodiment of the invention is described with reference to FIGS. 9-11. The following description is mainly of differences from circuit C1, C2 or C3 of the first three embodiments, and description that is the same as that of circuit C1, C2 or C3 is omitted.

(Structure of the Electrical Circuit)

As with circuit C3 (FIG. 8), circuit C4 includes starter motor 280, meter 410 and so forth. Compared with circuit C3, circuit C4 has a start switch 290 on an upstream side of relay 330. Start switch 290 may alternatively be provided on a downstream side of relay 330.

Voltage output by regulator 230 is not supplied to transistor TR1 of self-power-source holding circuit 120C. Instead, power from battery 240 is supplied in accordance with an operation of start switch 290. In other words, ECU 100C detects that engine 6 is about to operate not by detecting voltage output by regulator 230 but by detecting power supplied by battery 240 according to an operation of start switch 290.

(Operation of the Electrical circuit)

The following description describes (1) a starting operation of circuit C4 and (2) a terminating operation of circuit C4.

(1) Starting Operation

FIG. 10 is a flowchart of a starting operation of circuit C4. In step S211, a rider pushes start switch 290. In step S213, power (voltage) from battery 240 is supplied to transistor TR1 as start switch 290 is operated, and transistor TR1 turns on. In step S215, transistor TR2 turns on as transistor T1 turns on.

In step S217, CPU 110 starts an operation with power (a direct current) by battery 240 supplied via transistor TR2. In step S219, CPU 110 determines whether a starting state continues for a predetermined time (for example, three seconds). If the starting state continues for a predetermined time (YES in step S219), transistor TR3 is turned on in step S211, and a self-power-source holding is executed to maintain power supplied by battery 240 to ECU 100C.

In step S223, ECU 100C outputs an electrical signal to operate main relay 310. When main relay 310 is operated, power from battery 240 is supplied to starter motor 280, and the engine-related electrical components (ignition coil 10 injector 30, and fuel pump 40) and other electrical components (meter 410 and so forth) are connected with battery 240.

(2) Terminating Operation

FIG. 11 is a flowchart of a terminating operation of circuit C4. In step S251A, CPU 110 detects that pickup sensor 220 does not input an electrical signal for a predetermined time (for example, three minutes). In step S251B, CPU 110 detects whether engine stop switch 50 is kept pressed for a predetermined time. The processes in steps S251A and S251B are executed at the same time.

If pickup sensor 220 does not input any electrical signal for a predetermined time (YES in step S251A), or if engine stop switch 50 is kept pressed for a predetermined time (YES in step S251B), ECU 100C stops operation of main relay 310 in step S253, and disconnects the engine-related electrical components (ignition coil 10, injector 30 and fuel pump 40) and other electrical components (meter 410 and so forth) from battery 240. The processes in steps S255-S259 are the same as those of circuit C1 (see FIG. 5, steps S53-S57).

Function and Effect

According to the present invention, a start preparation state (the fact that engine 6 is about to start) is detected. When the start preparation state is detected, an electrical circuit maintains a connected state where the engine-related electrical components and battery 240 are connected. Accordingly, for example, when operation of kick pedal 8 to start engine 6 is detected, the engine-related electrical components and battery 240 are automatically connected. As a result, the engine-related electrical components operate.

In other words, where power from battery 240 is supplied to the engine-related electrical components, a main switch can be omitted. Even though a main switch is omitted, engine 6 can be started in the same manner as an engine of a conventional motorcycle without requiring any special operations (for example, by holding a clutch lever in and pressing a start switch).

The fuel injection system of motorcycle 1 must supply power steadily in order to conduct a steady fuel (air-fuel ratio) adjustment. When electric power generated by generator 210 is not sufficient while engine 6 is rotating at a low speed necessary electric power is supplemented by supplying power from battery 240 to the engine-related electrical components. According to the invention, a main switch can be omitted while power supplied by battery 240 is steadily supplied to the engine-related electrical components (ignition coil 10, injector 30, and fuel pump 40). In addition, power from battery 240 supplied to the engine-related electrical components is automatically terminated when engine 6 stops. Therefore, power supplied by battery 240 is not wasted while a main switch is not provided.

According to the invention, pickup sensor 220 (circuit C1) and the self-power-source holding circuit (for example, self-power-source holding circuit 120A in circuit C2) can detect the start preparation state without using power supplied by battery 240. Therefore, another power source (battery) for detecting the start preparation state is not necessary.

Other Embodiments

The details of the present invention have been disclosed through the descriptions of embodiments. However, the present invention is not limited to the descriptions and drawings of this disclosure, alterations of which may be apparent to a person skilled in the art.

For example, a method for detecting the start preparation state is not limited to the methods described above. The start preparation state may be detected, for example, when start switch 290 is kept pressed for a predetermined time (for example, three seconds).

The present invention is applicable is not limited to a motorcycle for off-road competitions and the like, but is also applicable to straddle-type vehicles such as three- and four-wheel vehicles.

The present invention includes various embodiments that are not described here. Accordingly, the technical scope of the present invention is determined only by the scope of claims appropriate from the above descriptions.

The invention claimed is:

1. A vehicle comprising:

an engine;

an electrical circuit including engine-related electrical components arranged to drive the engine and a battery that is arranged to supply power to the engine-related electrical components;

a connection controller arranged and programmed to control switching of the electrical circuit into a connected state in which the battery and the engine-related electrical components are connected and into a disconnected state in which the battery and the engine-related electrical components are disconnected; and an engine-start detector arranged to detect a start preparation state of the engine; wherein the connection controller is programmed to control switching of the electrical circuit from the disconnected state to the connected state according to a detection of the start preparation state by the engine-start detector, and to maintain the connected state; and the engine-start detector is arranged to detect the start preparation state according to an operation of a kick pedal of the vehicle.

2. A vehicle comprising:

an engine;

an electrical circuit including engine-related electrical components arranged to drive the engine and a battery arranged to supply power to the engine-related electrical components;

a connection controller arranged and programmed to control switching of the electrical circuit into a connected state in which the battery and the engine-related electrical components are connected and into a disconnected state in which the battery and the engine-related electrical components are disconnected; and an engine-start detector arranged to detect a start preparation state of the engine; wherein the connection controller is programmed to control switching of the electrical circuit from the disconnected state to the connected state according to a detection of the start preparation state by the engine-start detector, and to maintain the connected state; and the engine includes a crankshaft, and the engine-start detector is a crankshaft-rotation detection sensor.

3. The vehicle according to claim 2, wherein the connection controller is programmed to control switching of the electrical circuit from the connected state to the disconnected state if the crankshaft-rotation detection sensor does not detect a rotation of the crankshaft for a predetermined time.

4. A vehicle comprising:

an engine;

an electrical circuit including engine-related electrical components arranged to drive the engine and a battery arranged to supply power to the engine-related electrical components;

a connection controller arranged and programmed to control switching of the electrical circuit into a connected state in which the battery and the engine-related electrical components are connected and into a disconnected state in which the battery and the engine-related electrical components are disconnected; and an engine-start detector arranged to detect a start preparation state of the engine, wherein the connection controller is programmed to control switching of the electrical circuit from the disconnected state to the connected state according to a detection of the start preparation state by the engine-start detector, and to maintain the connected state; and the connection controller includes:

a first switching element arranged to detect an electrical signal, indicating the start preparation state output by the engine start detector and to allow continuity of the electrical signal according to a detection of the electrical signal;

a second switching element connected with the first switching element and the battery and arranged to supply a power supplied by the battery when the first switching element allows continuity of the electrical signal; and a control unit connected with the second switching element and programmed to control switching the disconnected state into the connected state according to power supplied by the battery through the second switching element and to maintain the connected state.

5. A vehicle comprising:

an engine;

an electrical circuit including engine-related electrical components arranged to drive the engine and a battery arranged to supply power to the engine-related electrical components;

a connection controller arranged and programmed to control switching of the electrical circuit into a connected state in which the battery and the engine-related electrical components are connected and into a disconnected state in which the battery and the engine-related electrical components are disconnected; and an engine-start detector arranged to detect a start preparation state of the engine; wherein the connection controller is programmed to control switching of the electrical circuit from the disconnected state to the connected state according to a detection of the start preparation state by the engine-start detector, and to maintain the connected state; and the engine-related electrical components include:

an injector arranged to spray fuel supplied to the engine;

a fuel pump arranged to supply fuel sprayed by the injector; and a fuel injection control unit arranged to control fuel sprayed by the injector.

6. A method for supplying power from a battery to engine-related electrical components of a vehicle that does not have a main switch, comprising:

detecting a start preparation state of the engine;

connecting the battery to the engine-related electrical components when the start preparation state is detected; and maintaining the connected state; wherein the start preparation state is detected by detecting operation of a kick pedal of the vehicle.

7. A method for supplying power from a battery to engine-related electrical components of a vehicle that does not have a main switch, comprising:

detecting a start preparation state of the engine;

connecting the battery to the engine-related electrical components when the start preparation state is detected; and maintaining the connected state; wherein the start preparation state is detected by detecting rotation of a crankshaft of the engine.

8. A method for supplying power from a battery to engine-related electrical components of a vehicle that does not have a main switch, comprising:

detecting a start preparation state of the engine;

connecting the battery to the engine-related electrical components when the start preparation state is detected;

maintaining the connected state; and disconnecting the battery from the engine-related electrical components when rotation of a crankshaft is not detected for a predetermined time.

9. A vehicle comprising:

an engine;

an electrical circuit including engine-related electrical components arranged to drive the engine and a battery arranged to supply power to the engine-related electrical components;

a connection controller arranged and programmed to control the electrical circuit to be switched into a connected state in which the battery and the engine-related electrical components are connected and into a disconnected state in which the battery and the engine-related electrical components are disconnected; and an engine-start detector arranged to detect a starting operation of the engine; wherein the connection controller is programmed to control switching of the electrical circuit from the disconnected state to the connected state according to a detection of the starting operation by the engine-start detector, and to maintain the connected state such that the battery supplies power to the engine-related electrical components when the connection controller brings the engine-related electrical components into an electrically connected state with the battery.

10. The vehicle according to claim 9, further comprising:

a crankshaft in the engine;

a starter motor arranged to receive and use power supplied by the battery to rotate the crankshaft and start the engine; and a starter motor switch arranged to connect the battery and the starter motor; wherein the connection controller includes a relay arranged to supply power from the battery to the engine-related electrical components when the battery and the starter motor are connected by an operation of the starter motor switch.

11. The vehicle according to claim 9, further comprising:

a generator arranged to be driven by the engine, and a regulator arranged to regulate a voltage of electric power generated by the generator in a predetermined range, wherein the engine-start detector is an electrical circuit arranged to detect electric power output by the regulator.

12. The vehicle according to claim 11, wherein the connection controller is programmed to control switching of the electrical circuit from the connected state to the disconnected state if electric power output by the regulator is not detected for a predetermined time.

13. A method for supplying power from a battery to engine-related electrical components of a vehicle that does not have a main switch, comprising:

detecting a starting operation of the engine;

connecting the battery to the engine-related electrical components when the starting operation is detected; and maintaining the connected state; wherein the battery supplies power to the engine-related electrical components when a connection controller brings the engine-related electrical components into an electrically connected state with the battery.

14. A method according to claim 13, wherein the start preparation state is detected by detecting power output by a regulator.

15. A method according to claim 13, further comprising:

disconnecting the battery from the engine-related electrical components when power output by a regulator is not detected for a predetermined time.

* * * * *